July 6, 1954     P. S. MORGAN     2,682,776
TRANSMISSION
Filed Sept. 17, 1952     4 Sheets-Sheet 1
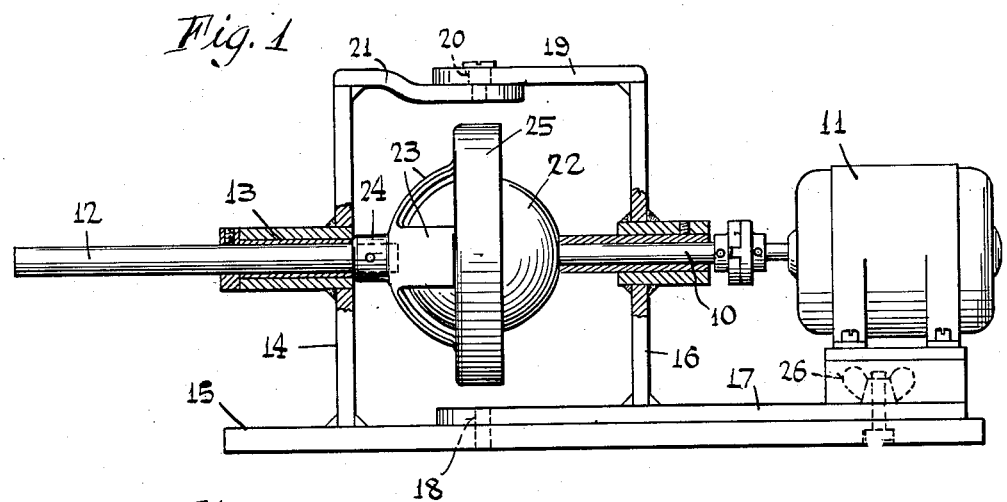
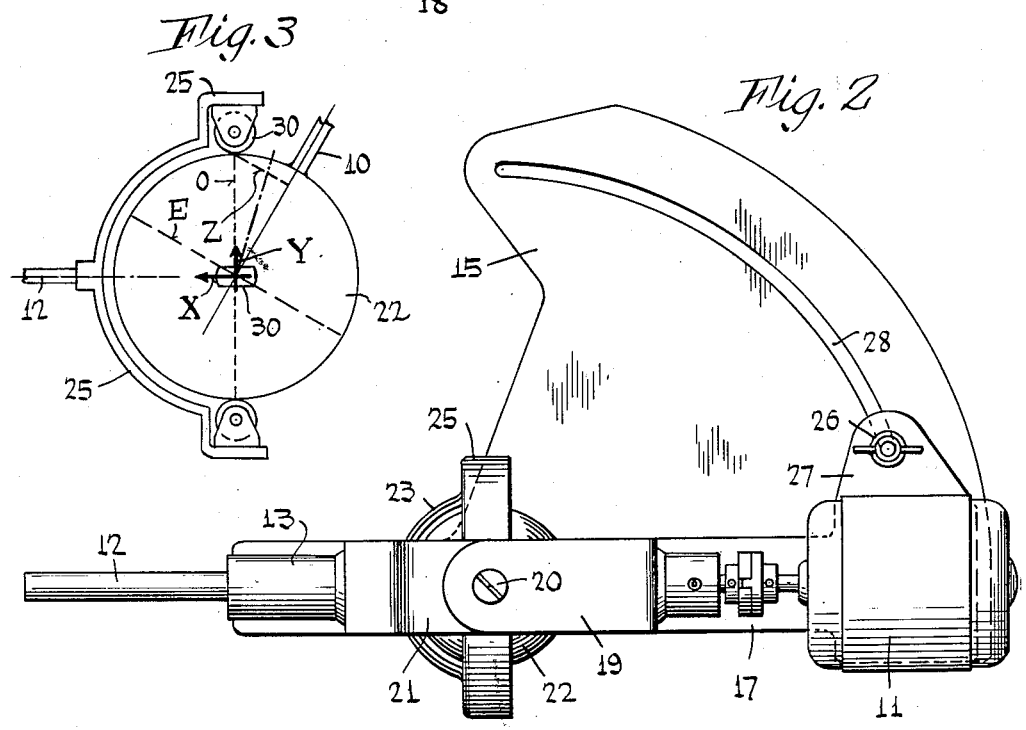
INVENTOR
Porter S. Morgan
BY Johnson and Kline
ATTORNEYS July 6, 1954 P. S. MORGAN 2,682,776
TRANSMISSION
Filed Sept. 17, 1952 4 Sheets-Sheet 2

INVENTOR
Porter S. Morgan
BY Johnson and Kline
ATTORNEYS

July 6, 1954 P. S. MORGAN 2,682,776
TRANSMISSION

Filed Sept. 17, 1952 4 Sheets-Sheet 3

INVENTOR
Porter S. Morgan
BY Johnson and Kline
ATTORNEYS

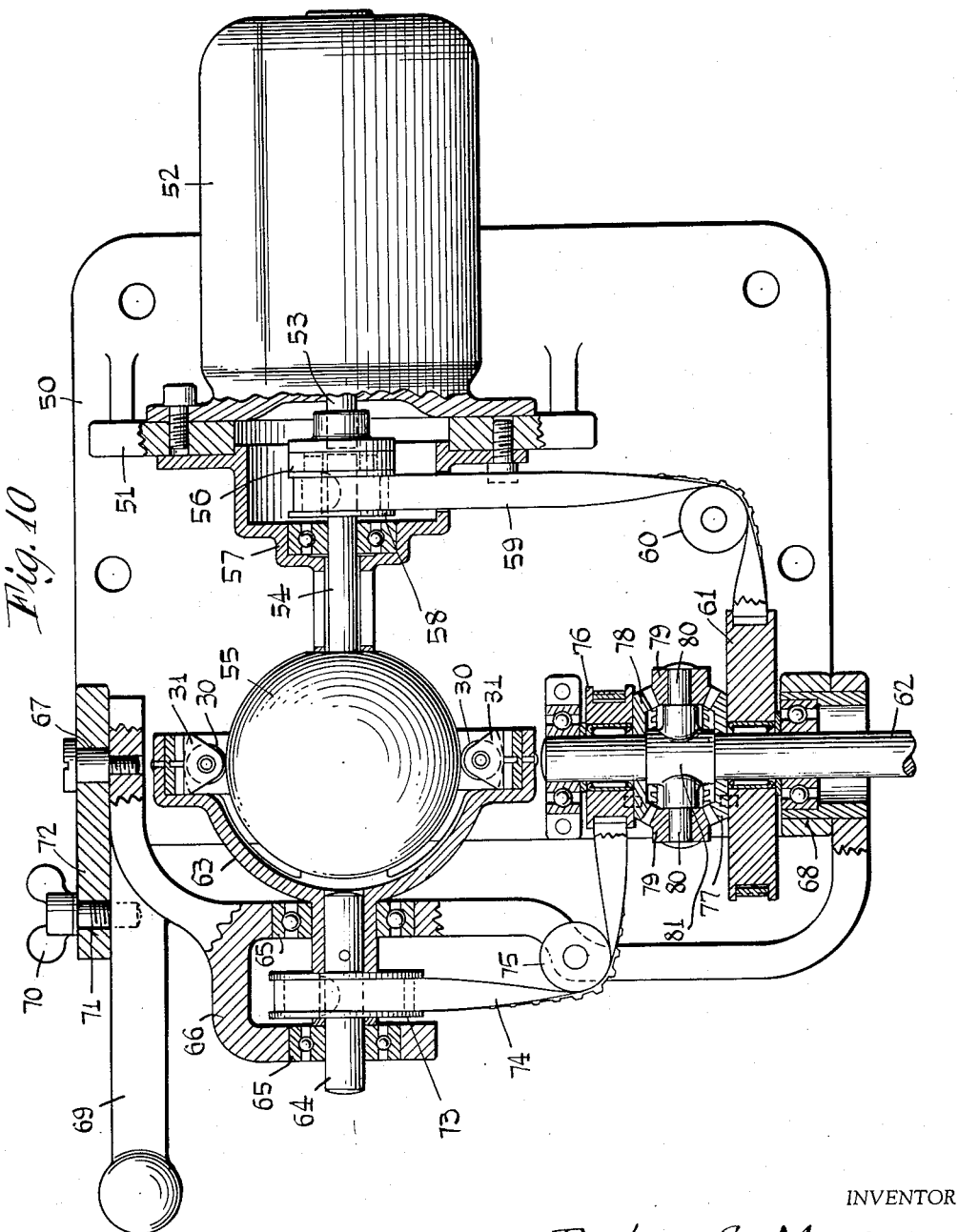

Patented July 6, 1954

2,682,776

UNITED STATES PATENT OFFICE 2,682,776

TRANSMISSION

Porter S. Morgan, Westport, Conn., assignor, by mesne assignments, to Edward P. Bullard III, West Hartford, Conn.

Application September 17, 1952, Serial No. 310,021

13 Claims. (Cl. 74—198)

This invention relates to mechanical friction transmissions or drives continuously variable within limits.

An object of the invention is to provide a practical, continuously variable speed transmission which is characterized by extremely low losses and high efficiency. This is accomplished by the provision of a transmission in which the friction between the engaging driving and driven members, when the latter move relatively, is substantially wholly rolling friction, as distinguished from sliding friction.

Another object of the invention is to provide an improved continuously variable friction drive in which, for rated loads, slippage between the driving and driven members is obviated. I accomplish this by an arrangement wherein the pressure between the friction surfaces automatically increases as the load increases and vice versa, thereby reducing the tendency to slippage and the wearing of the parts.

A further object of the invention is to provide an improved variable speed friction transmission as above characterized, which has a smooth continuously variable vibrationless action.

Still another object of the invention is to provide an improved variable friction drive as above set forth, in which the friction surfaces need not be made of "friction" materials but may all be of hardened metal, as made possible by the rolling friction action, resulting in a minimum of wear.

A feature of the invention is the provision of an improved variable speed friction drive as above set forth, in which all or the essential parts may be completely immersed in an oil bath without impairing the power transmission of the drive, thereby making possible high efficiency and reduced wear over an extended period of use.

These and other objects of this invention to which reference will hereinafter be made, have been attained as a result of my discovery of the fact that a rotatable body may be caused to maintain a gripping driving relation between itself and another member while rolling in contact with said other member, and that the gripping relation may result in transmitting motion and/or power between them. Applying this new principal to a variable speed transmission, I have discovered that when one of the members is a sphere or has spherical surfaces and the other member is mounted to revolve in an orbit around the sphere and is adjustable relative to the center of the sphere so that the orbit may be shifted from over the equator to over one of an infinite member of great circles, a rotatable coupling body, interposed between the members in clamping or wedging relation thereto having a plane of rotation transverse to the plane of rotation of the member revolving about the sphere, will transmit motion and/or power from the one member to the other at a determinate ratio. This ratio is equal to the cosine of the angle between the axes of rotation of the driving and driven members. The angle of displacement of the input and output shafts is limited to somewhat less than 90° in view of the necessity of providing supporting and operating means for the sphere. Hence, the ratio range is from 1:1 to say 3:1 or more. However, if a greater range is desired, two or more of my transmission units may be coupled together in series. Further, an arrangement may be made using a differential mechanism to produce a range from zero to any desired speed, more or less approaching a 1:1 ratio depending on the relative size and ratio of the parts.

The rotatable body, herein called the roller, having a cylindrical or spherical working surface makes only point contact with the sphere, and thus there is avoided sliding friction between the parts (an inherent fault with prior friction drives) resulting from contacting surfaces traveling at different surface speeds. When the roller revolves about the sphere in a path over the equator of the sphere, as in a 1:1 ratio position, and also when the roller reaches that part in a great circle orbit which is closest to the pole of the sphere, as when the input and output shafts are angularly shifted, the plane of rotation of the roller, because of the way the roller is mounted, is at right angles, i. e. 90°, to the plane of rotation of that part of the sphere with which the roller is in contact. At such times there is no tendency for the roller to rotate and it moves bodily with the sphere. At all other times the plane of rotation of the roller is at an angle other than 90° to the plane of rotation of the contacting point of the sphere and rolls on the surface of the sphere on its own axis while maintaining its driving connection with the sphere. The difference between the speed of this bodily or power transmitting travel of the roller and the surface speed of the contacting point of the sphere is compensated for by rotation of the roller on its axis and no sliding or slipping between the surface of the sphere and the surface of the roller occurs.

While the principle of operation of my transmission is best understood by assuming the presence of only one roller, a condition which may exist where the load is light, an important feature of this invention is that a plurality of rollers may be employed as coupling or driving members, thus distributing the load over many rollers and over a substantial portion of the surface of the sphere, thereby reducing the burden on each roller, reducing the pressure applied to effect the wedging action between each roller and the sphere, and thus reducing the crushing effect on the rollers. The use of a plurality of coupling or driving members operating together on one driving surface to distribute the load was not possible or practical with prior mechanical transmissions.

A further feature of this invention is the provision of a transmission employing, in addition to the sphere and roller drive above referred to, a differential mechanism in part driven by the output shaft and in part driven by the input shaft and so arranged that the algebraic total of the speeds of the output shaft and input shaft is transmitted to the power take-off shaft of the device. With this form of transmission, by adjusting the angle of the input shaft with regard to the output shaft, the range of speed change may be from a determinate ratio to that in which the power take-off shaft does not move.

Other features and advantages will hereinafter appear.

In the accompanying drawings:

Figure 1 is a side view of the transmission of my invention.

Figure 2 is a plan view of the transmission shown in Figure 1.

Figure 3 is a diagrammatic view showing the various positions of the driving member, the driven member and the coupling rollers carried thereby.

Fig. 10 is a plan view, partly in section, of a transmission in which the input and output shafts of the variable speed unit are connected to a differential mechanism whereby the speed of the power take-off shaft may be from zero to a determinate ratio of the input shaft.

Figure 4:
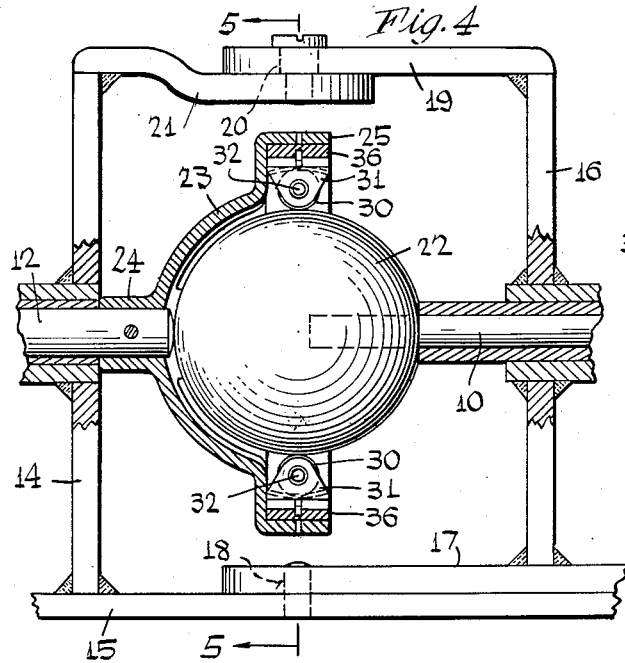
Fig. 4 is an enlarged view, partly in section, of the driving and driven member shown in Fig. 1 and mounting means therefor.

In the form of the invention herein illustrated as exemplary thereof, there is an input shaft 10 connected to a source of power which may be in the form of an electric motor 11 as shown and an output shaft 12 to which suitable gearing, pulleys, etc., may be attached. The shaft 12 is rotatably mounted in a bearing 13 carried by a bracket 14, the lower end of which is fastened to a base plate 15. The shaft 10 is mounted in a bracket 16 secured to a plate 17 which also carries the motor 11. The plate 17 has a pivotal connection 18 with the base plate 15 and the upper end of the bracket 16 has an overhanging arm 19 having a pivotal connection 20 with an overhanging arm 21 of the bracket 14. The pivotal connections 18 and 20 are axially aligned.

The shaft 10 has secured to it a sphere 22 which is positioned so that its center is aligned with the pivotal connections 18 and 20. The shaft 12 has secured to it, by arms 23 carried by a hub 24, a ring 25 which surrounds the sphere 22 in spaced relation therewith. The ring is so positioned that its plane of rotation is aligned with the axes of the pivotal connections 18 and 20 and the center of the sphere.

It will thus be observed that, when the shafts 10 and 12 are in alignment, the ring 25 travels in an orbit overlying the equator of the sphere. In this position, as will be explained below, the ratio of speed between the shafts 10 and 12 is 1:1 or direct. When the plate 17 with the parts carried thereby including the shaft 10 and sphere 22, is shifted on the base 15 on its pivotal connections 18 and 20, the relation between the ring 25 and sphere 22 is changed so that the orbit of the ring will be over great circles which approach the poles of the sphere more or less depending upon the angular displacement of the shafts 10 and 12.

In the form of the invention illustrated in Figs. 1 and 2, the plate 17 may be held in adjusted position by a wing nut 26 on an extension 27 of the plate 17 riding in a slot 28 in the base plate 15.

The sphere 22 and the ring 25 are coupled in driving relation by units 29 each comprising a roller 30 and a bracket 31, each unit being interposed between the ring 25 and the sphere 22 with the bracket engaging the ring and the surface of the roller engaging the sphere. Basically, it is sufficient if there is only one unit 29 interposed between the ring 25 and the sphere 22. However, to distribute the load and to dynamically balance the ring 25, it is advantageous that a plurality of units be evenly spaced around and inside the ring 25.

The bracket 31 as shown is substantially U-shaped and carries an axle 32 for the roller 30, roller or antifriction bearings 33 being interposed between the axle 32 and the roller 30. The upper end of the bracket has a fin 34 extending into a circular groove 35 in a wear-resisting ring 36 carried by the ring 25. The fin 34 has a notch 37 which receives the end of a fulcrum pin 38 carried by the ring 25. Thus the bracket is guided and controlled for tilting or swinging movement about the fulcrum pin 38 in the plane of rotation of the ring 25 and at right angles to the plane of rotation of the roller 30. The tilting movement of the bracket is caused by the slight relative movement between the sphere 22 and the ring 25 when the sphere begins to turn. It is this movement which causes the roller 30 to grip the sphere. This is accomplished by providing cooperating cam surfaces 39 and 40 on the wear ring 36 and on the bracket 31.

In the form of the invention shown, the wedging surface 40 is an arc having the same center as the arcuate surface of the roller 30, and the wedging surface 39 is flat and forms an angle of approximately 7½° with respect to the arcuate surface of the bracket. Thus, when lateral pressure is brought to bear on the bracket due to the initial frictional drag between the surface of the roller and the surface of the sphere, the coupling unit 29 is caused to tilt about the fulcrum pin 38 and this causes the cam surfaces, because of their shape and position, to wedge the roller tightly against the sphere and form a driving connection therewith and at the same time to wedge the bracket tightly against the wear ring 36 on the roller carrier.

When the shafts 10 and 12 are aligned as shown in Figs 1, 2, 4 and 5 and diagrammatically in Fig. 3 so that the plane of rotation of the equator E of the sphere is at right angles to the plane of rotation of the roller 30 about its axle 32, the wedging drive connection between the roller and the sphere causes the sphere and ring to travel at the same angular speed without rotation of the rollers on their axes, and a ratio of 1:1, i. e. a direct drive, between the shafts 10 and 12 is established.

For purposes of explanation, it will be assumed that the shaft 10 and sphere 22 are the driving members while the shaft 12 and the ring 25 are the driven members. However, it should be understood that the situation may be reversed and that either shaft may be the driving member.

When the shafts 10 and 12 are shifted out of alignment, as shown in Fig. 3, so that the orbit O of the rollers follows a great circle on the sphere twice intersecting the equator of the sphere, the plane of rotation of the roller over the equator is at an angle less than 90° to the plane of rotation of the equator with the result that force applied by the sphere to the ring has two components—a component X tending to rotate the roller on its axis and a component Y tending to revolve the roller bodily about the axis of the shaft 12. If, for instance, as diagrammatically shown in Fig. 3, the shafts 10 and 12 are displaced 60° from alignment, the force acting on the roller over the equator of the sphere divides into the components X and Y equally, and thereby the component Y tends to revolve the roller ring at one half the peripheral speed of the equator of the sphere, the other motion imparted to the roller causing the roller to rotate as it does without loosing its wedging gripping engagement with the sphere. As the roller proceeds along the great circle, the angular relation between the plane of contact of the roller with the sphere and the plane of rotation of the roller changes and the roller rotating component becomes less while the roller and ring revolving component becomes relatively greater. When the limit of the orbit toward the poles is reached, the plane of rotation of the point of contact of the roller with the sphere and the plane of rotation of the roller on its axis are at right angles i. e. 90° and at that instant the roller and sphere travel without rotating the roller. At this point also the lever arm Z of the sphere at the point of contact is shorter than the lever arm at the equator with the result that, in the example given where the displacement is 60°, the length of the lever arm is half the radius of the sphere and a 1:2 speed ratio is established.

Thus it will be seen that in adjusting the angularity of the shaft from 180° downward, the orbit of the roller-carrying ring and rollers thereon follows great circles, and that the nearer the limits of the great circles approach the poles of the sphere, the greater the reduction of transmitted motion from the sphere to the ring. The ratio of reduction is as 1 is to the cosine of the angle between the shafts.

Thus, for example, if the angle between the shafts is 60°, the cosine of which is .50, the ratio is 2:1. If the angle is 41° and 21', the cosine of which is .75, the ratio will be 1½:1. If the angle is 73° as indicated in dot-and-dash lines in Fig. 3, the cosine of which is .292, the ratio is approximately 3½:1.

The rotation of the rollers on their axes, in spite of their wedging and driving connections with the sphere, is made possible by the employment of the antifriction bearings 33 between each roller and its axle 32. Otherwise, the friction between the roller and its axle might so closely approach the friction between the surface of the roller and the surface of the sphere that the roller would be prevented from rotating and the device would lock and be inoperative.

While a plurality of spaced rollers is desirable for practical reasons to distribute the load so that the crushing effect on each roller may be reduced and so that the device may be easily balanced, it should be understood that each roller also operates independently and carries its proportional share of the load at every point in the great circle track which it follows. This is demonstrated by the successful use of only one roller as the sole driving connection between the sphere and the roller ring.

Each roller 30 rotates on its axis in one direction in approaching a pole of the sphere, stops rotating at the point in the great circle nearest the pole, and rotates in the opposite direction until the point nearest the other pole is reached when it again stops rotating.

For the cases where it is desired that the transmission be variable to the point where no motion is transmitted, the present invention incorporates, with the sphere and roller unit above described, a differential mechanism, one side of which is operated by the power input shaft and the other side by the variable speed unit with a possible speed ratio and direction of rotation between the two sides such that at a determinate speed of the variable speed unit they balance out each other and result in no speed on the power output shaft of the device. An example of such an arrangement is illustrated in Fig. 10.

Another feature of the construction shown in Fig. 10 is that the power input and take-off shafts may be fixed against angular displacement notwithstanding the fact that the shaft for the sphere and the shaft for the roller carrier are relatively angularly displaceable for speed variation. This is accomplished, in the form of the invention shown in Fig. 10, by transmitting the power from the roller carrier shaft to a member having its axis aligned with the axis of adjustment of the roller carrier.

As shown in Fig. 10, the device comprises a base plate 50 having a bracket 51 carrying an electric motor 52. The motor 52 has a shaft 53 aligned with a shaft 54 carrying a spherical body 55. A coupling unit 56 connects the shafts 53 and 54 and a bearing 57 supports the end of the shaft 54. The shaft 54 carries a pulley 58 which drives a belt 59 which passes over a turning pulley 60 and engages a pulley 61 having a bearing on a power output shaft 62 but is freely rotatable thereon.

The roller-carrying ring 63 is mounted on a shaft 64 carried in bearings 65 and a bracket 66, one arm of which has a pivotal connection 67 with the frame 50 while the other arm has a pivotal connection 68 with an opposite portion of the frame 50. The pivotal connections 67 and 68 are in alignment so that the bracket 66 and the roller-carrying ring 63 may be angularly displaced with relation to the power input shaft 54 and sphere 55. This displacement may be effected by a handle 69 carried by the bracket 66 and it may be locked in adjusted position by a thumb screw 70 carried by the handle and extending through an arcuate slot 71 in a segment 72 carried by the frame in the same manner that the plate 17 is locked to the frame in the form of the invention shown in Fig. 2.

The roller-ring carrying shaft 64 is provided with a pulley 73 over which extends a belt 74 which engages a turning pulley 75 and a pulley 76 carried by the power take-off shaft 62 but freely rotatable thereon. The pulley 75 is carried by the bracket 66 and thus the bracket 66 may be adjusted angularly relative to the frame 50 without disturbing the driving connection between the shaft 64 and the pulley 76, the axis of which is aligned with the pivotal connections 67 and 68 of the frame.

The pulley 61 is secured to a bevel gear 77 while the pulley 76 is connected to a bevel gear 78. Idler gears 79 engaging the gears 77 and 78 are mounted on studs 80 carried by a hub 81 secured to the power take-off shaft 62. The gears 77, 78 and 79 form a differential mechanism to transmit to the power take-off shaft power at constant speed which it receives from the electric motor and power at variable speed which it receives through the variable speed drive.

Figure 6:
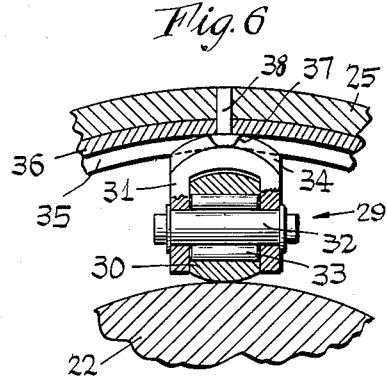
Fig. 6 is a detail sectional view showing the mounting of the driving units between the driving member and the driven member.
Figure 5:
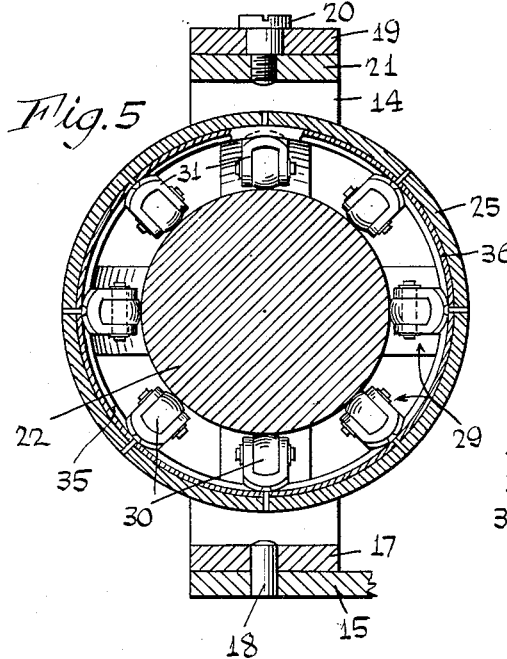
Fig. 5 is a transverse sectional view taken approximately on the line 5—5 of Fig. 4.
Figure 7:
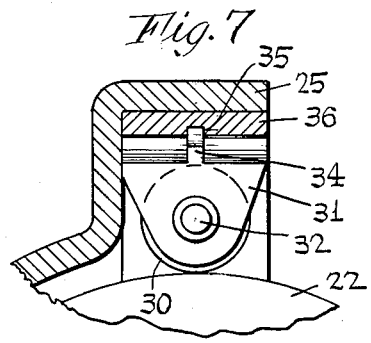
Fig. 7 is a sectional view, on an enlarged scale, showing the mounting and guiding means for the bracket-carrying roller.

The rollers 30, brackets 31 and supporting and guiding parts therefor are the same as those shown in Figs. 5, 6 and 7.

By the employment of pulleys 58, 61, 73 and 76 of different diameters, it is possible to produce a large variety of variations between the power input shaft 53 and the power take-off shaft 62 and, as stated above, it is possible at a determinate speed on the output shaft of the variable speed unit to obtain a situation where the power take-off shaft has no motion or power transmitted to it.

If the specific construction shown in Fig. 10, the arrangement is such that when the variable speed unit is adjusted to a 3:1 ratio, the output shaft 62 has no motion transmitted to it. For this purpose, the ratio of the pulleys 61 and 58 is 3:1 while that of the pulleys 73 and 76 is 1:1. Thus it will be seen that if the motor 52 has a speed of 1800 R. P. M. so that the pulley 61 and bevel gear 77 rotate clockwise at 600 R. P. M. and the output shaft 64 is turning at 600 R. P. M., the pulley 76 and gear 78 turning clockwise, no motion is transmitted to the shaft 62. When the ratio of the variable speed unit is 1:1, the speed of the power take-off shaft 62 is 1200 R. P. M.

Figure 11:
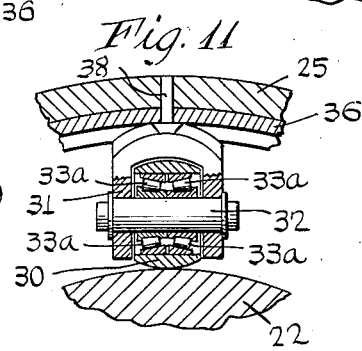
Fig. 11 is a view similar to Fig. 6, but showing a modified form of bearing arrangement for the roller to eliminate friction between the sides of the roller and its mounting.
Figure 8:
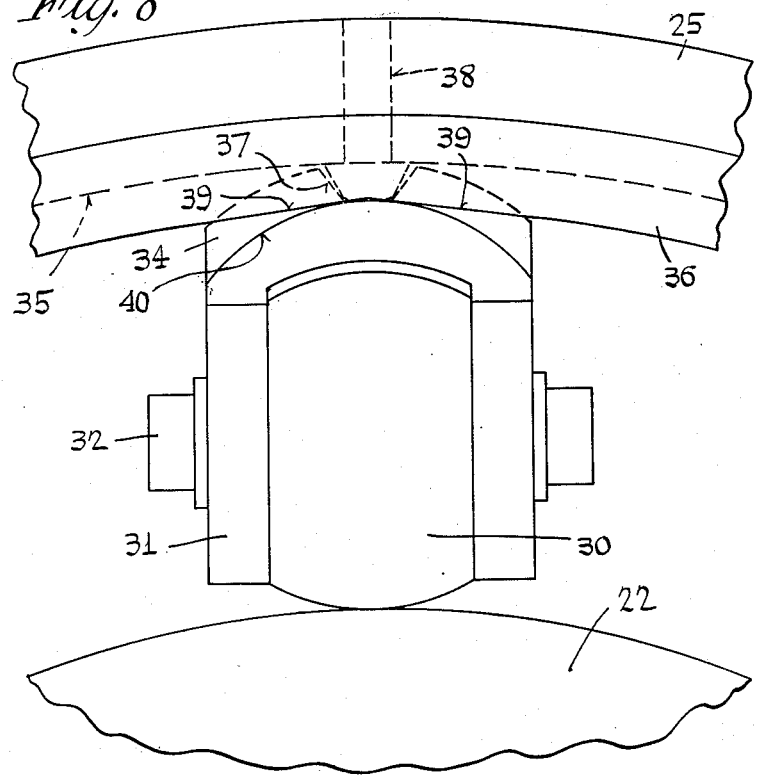
Fig. 8 is an enlarged diagrammatic view, similar to Fig. 6, showing the relationship between the camming surfaces on the bracket and on the roller-carrying ring.
Figure 9:
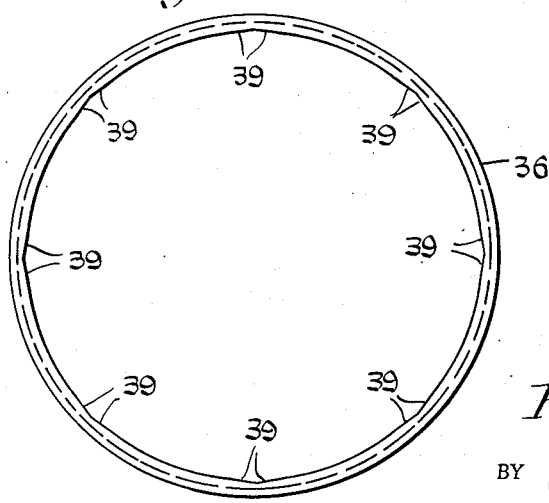
Fig. 9 is an enlarged view of the roller-carrying ring showing the camming surfaces thereon.

As shown in Fig. 11, the antifriction bearings between the roller 30 and its axle may include tapered rollers 33a to absorb side thrust and eliminate friction between the sides of the roller 30 and the sides of the bracket 31.

In the above description and in the claims, the body 22 is sometimes referred to as a sphere. This term is intended to denote such portions of a spherical body as are employed, for it will be understood that the portion of the sphere receiving the shaft and the portion opposite it may be flattened off, since the rollers cannot engage these portions.

Variations and modifications may be made within the scope of the claims and portions of the improvements may be used without others.

I claim:

1. A variable speed drive comprising a first shaft; a second shaft; means for mounting said shafts for angular adjusting movement of at least one relative to the other in the same plane about an axis at right angles to and intersecting the axes of the shafts to and from position in which the shafts are more or less in alignment; a spherical body carried by said first shaft with its center aligned with the said axis of adjustment of the shafts; a roller carrier mounted on said second shaft and extending over said spherical body and in proximity thereto at least at said axis of adjustment; a motion transmitting roller; a bracket in which said roller is rotatably mounted and with the roller fitting between the spherical body and said carrier; means coupling the bracket to the carrier for bodily movement therewith so that the plane of rotation of the roller is at right angles to the plane of rotation of the carrier and the surface of the roller engages the surface of the spherical body; means guiding the movement of the bracket relative to the carrier in the plane of rotation of the carrier; and means causing tilting movement of the bracket and roller in said plane of rotation of the carrier to urge the roller toward said spherical body as a result of relative rotation between the carrier and the spherical body and wedge the roller and bracket between the carrier and the spherical body and thereby form a driving connection between the same.

2. A variable speed drive comprising a first shaft; a second shaft; means for mounting said shafts for angular adjusting movement of at least one relative to the other in the same plane about an axis at right angles to and intersecting the axes of the shafts to and from position in which the shafts are more or less in alignment; a spherical body carried by said first shaft with its center aligned with the said axis of adjustment of the shafts; a roller carrier mounted on said second shaft and extending over said spherical body and in proximity thereto at least at said axis of adjustment; a motion transmitting roller; a bracket in which said roller is rotatably mounted and with the roller fitting between the spherical body and said carrier; means coupling the bracket to the carrier for bodily movement therewith so that the plane of rotation of the roller is at right angles to the plane of rotation of the carrier and the surface of the roller engages the surface of the spherical body; means guiding the movement of the bracket relative to the carrier in the plane of rotation of the carrier; and means causing tilting movement of the bracket and roller in said plane of rotation of the carrier to urge the roller toward said spherical body as a result of relative rotation between the carrier and the spherical body and wedge the roller and bracket between the carrier and the spherical body and thereby form a driving connection between the same; the roller being free to rotate on its axis while maintaining its wedging and driving connection with the spherical body while rolling on a great circle of the spherical body when the shafts are angularly disposed relative to each other.

3. The invention as defined in claim 1, in which the means for urging the bracket and roller comprises cooperating cam surfaces on the bracket and on the roller carrier.

4. A variable speed drive comprising a first shaft; a second shaft; means for mounting said shafts for angular adjusting movement of at least one relative to the other in the same plane about an axis at right angles to and intersecting the axes of the shafts to and from position in which the shafts are more or less in alignment; a spherical body carried by said first shaft with its center aligned with the said axis of adjustment of the shafts; a ring mounted on said second shaft and extending around said spherical body and in proximity thereto at least at said axis of adjustment; a plurality of motion transmitting rollers; a bracket in which each roller is rotatably mounted and with the roller fitting between the spherical body and said ring; means spaced around said ring for coupling each bracket to the ring for bodily movement therewith so that the plane of rotation of each roller is at right angles to the plane of rotation of the ring and the surface of each roller engages the surface of the spherical body; means guiding the movement of each bracket relative to the ring in the plane of rotation of the ring; and means causing tilting movement of each bracket and roller in said plane of rotation of the ring to urge the roller toward said spherical body as a result of relative rotation between the ring and the spherical body and wedge the roller and bracket between the ring and the spherical body and thereby form a driving connection between the same.

5. A variable speed drive comprising a first shaft; a second shaft; means for mounting said shafts for angular adjusting movement of at least one relative to the other in the same plane about an axis at right angles to and intersecting the axes of the shafts to and from position in which the shafts are more or less in alignment; a spherical body carried by said first shaft with its center aligned with the said axis of adjustment of the shafts; a ring mounted on said second shaft and extending around said spherical body and in proximity thereto at least at said axis of adjustment; a plurality of motion transmitting rollers; a bracket in which each roller is rotatably mounted and with the roller fitting between the spherical body and said ring; means spaced around said ring for coupling each bracket to the ring for bodily movement therewith so that the plane of rotation of each roller is at right angles to the plane of rotation of the ring and the surface of each roller engages the surface of the spherical body; means guiding the movement of each bracket relative to the ring in the plane of rotation of the ring; and means causing tilting movement of each bracket and roller in said plane of rotation of the ring to urge the roller toward said spherical body as a result of relative rotation between the ring and the spherical body and wedge the roller and bracket between the ring and the spherical body and thereby form a driving connection between the same; the roller being free to rotate on its axis while maintaining its wedging and driving connection with the spherical body while rolling on a great circle of the spherical body when the shafts are angularly disposed relative to each other.

6. The invention as defined in claim 4, in which the means for urging the bracket and roller comprises cooperating cam surfaces on the bracket and on the roller carrier.

7. A variable speed transmission having as the essential motion transmitting members a spherical body and a roller, means mounting the sphere for rotation on a determinate axis, means mounting the roller for travel around the sphere on a selected one of a plurality of great circles with its surface in driving engagement with the surface of the sphere, means for mounting the roller for rotation on its own axis only in a plane which is substantially at right angles to its plane of travel around the sphere, means for angularly displacing the axis of rotation of the roller with respect to its plane of travel to cause the roller to wedgingly lock against the sphere, and power input and output means, one connected to the sphere and the other connected to the first-named roller mounting means.

8. A continuously variable speed transmission having as the essential motion transmitting members a spherical body and a roller, means mounting the sphere for rotation on a determinate axis, means mounting the roller for travel around the sphere on a single selected great circle with its surface in driving engagement with the surface of the sphere, means for mounting the roller for rotation on its own axis only in a plane which is substantially at right angles to its plane of travel around the sphere, means for angularly displacing the axis of rotation of the roller with respect to its plane of travel to cause the roller to wedgingly lock against the sphere, means for continuously angularly displacing the axis of rotation of the sphere and first-named roller mounting means to select other great circles more or less displaced from the equator of the sphere to vary the speed of the motion transmitted, and power input and output means, one connected to the sphere and the other connected to the first-named roller mounting means.

9. The invention as defined in claim 7, in which the means angularly displacing the axis of the roller operates to increase the force of the driving engagement between the surfaces of the roller and sphere in response to increase in the load to be transmitted.

10. The invention as defined in claim 7, in which the means angularly displacing the axis of the roller is responsive to relative rotational movement between the sphere and the first-named roller mounting means for controlling the force of the driving engagement between the surfaces of the roller and the sphere.

11. The invention as defined in claim 7, in which the means angularly displacing the axis of the roller is responsive to relative rotational movement between the sphere and the first-named roller mounting means in both directions of rotation for controlling the force of the driving engagement between the surfaces of the roller and the sphere.

12. The invention as defined in claim 7, in which there are additional rollers and second-named mounting members therefor carried by said first-named mounting means with the rollers simultaneously engaging other parts of the sphere on the same great circle.

13. The invention as defined in claim 7, in which the driving engagement between the spherical body and the roller is obtained by means of wedging the surface of the roller against the surface of the spherical body, and the roller is mounted on anti-friction bearings so that the friction between the roller and its mounting is inappreciable in comparison with the friction between the surface of the roller and the sphere.

References Cited in the file of this patent

UNITED STATES PATENTS

| Number | Name | Date |
|---|---|---|
| 1,146,982 | Weiss | July 20, 1915 |
| 1,826,408 | Tenney | Oct. 6, 1931 |
| 2,092,437 | Weiss | Sept. 7, 1937 |

FOREIGN PATENTS

| Number | Country | Date |
|---|---|---|
| 799,672 | France | June 17, 1937 |